US008571530B2

(12) United States Patent
Heikkila et al.

(10) Patent No.: US 8,571,530 B2
(45) Date of Patent: Oct. 29, 2013

(54) PRIVACY STAMP FOR COVER UI

(75) Inventors: Paivi Heikkila, Tampere (FI); Sanna Koskinen, Tampere (FI); Katja Konkka, Tampere (FI); Sanna Lindroos, Tampere (FI)

(73) Assignee: Nokia Corporation, Espoo (FI)

( * ) Notice: Subject to any disclaimer, the term of this patent is extended or adjusted under 35 U.S.C. 154(b) by 340 days.

(21) Appl. No.: 12/086,952

(22) PCT Filed: Dec. 19, 2005

(86) PCT No.: PCT/IB2005/054319
§ 371 (c)(1),
(2), (4) Date: Dec. 22, 2009

(87) PCT Pub. No.: WO2007/072112
PCT Pub. Date: Jun. 28, 2007

(65) Prior Publication Data
US 2010/0216440 A1    Aug. 26, 2010

(51) Int. Cl.
*H04M 3/42* (2006.01)
(52) U.S. Cl.
USPC ...... 455/415; 455/567; 455/566; 379/142.01; 379/211.02; 379/355.04; 379/142.09

(58) Field of Classification Search
USPC ........ 455/415, 567, 566; 379/142.01, 142.09, 379/211.02, 355.04
See application file for complete search history.

(56) References Cited

U.S. PATENT DOCUMENTS 6,215,993 B1 *    4/2001    Ulveland ...................... 455/415
2006/0168539 A1 *  7/2006    Hawkins et al. .............. 715/780

FOREIGN PATENT DOCUMENTS

| EP | 1 107 623 A2 | 6/2001 |
| EP | 1 187 434 A2 | 3/2002 |
| GB | 2 391 750 A | 2/2004 |
| JP | 10-276259 | 10/1998 |
| JP | 10-276259 A | 10/1998 |
| JP | 2000-196734 A | 7/2000 |
| JP | 2002-281562 A | 9/2002 |
| JP | 2003-273968 A | 9/2003 |
| KR | 2005/0101044 | 10/2005 |

* cited by examiner

*Primary Examiner* — Meless N Zewdu
*Assistant Examiner* — Jean Chang
(74) *Attorney, Agent, or Firm* — Harrington & Smith

(57) ABSTRACT

A privacy stamp for preventing the automatic display of private data items stored in a memory of a mobile telecommunications apparatus. The telecommunications apparatus is provided with user operable means to selectively associate a privacy stamp with the stored data items such that a processor prevents the data items associated with the privacy stamp from being automatically displayed on a user interface.

12 Claims, 6 Drawing Sheets

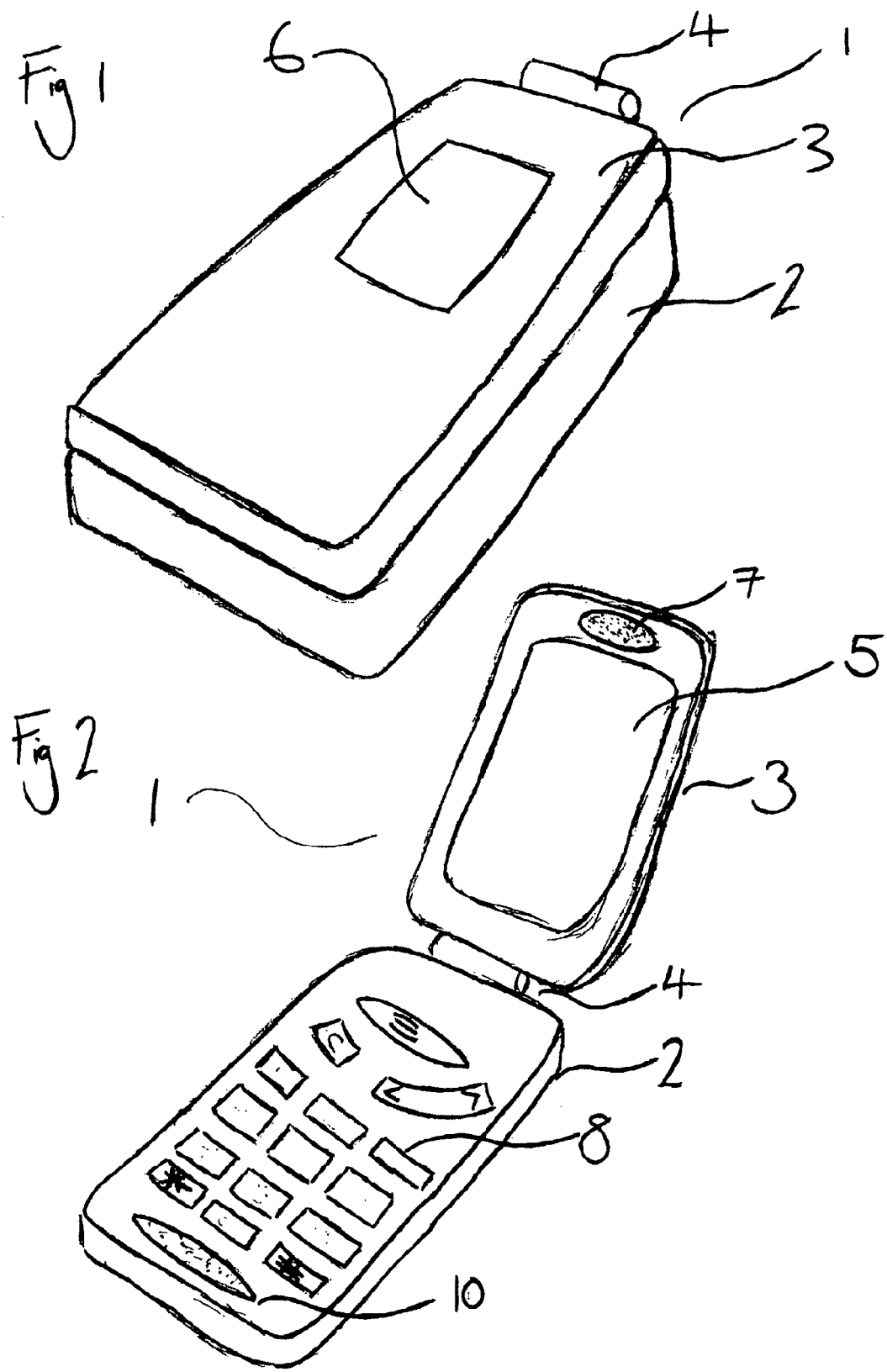

PRIVACY STAMP FOR COVER UI

FIELD OF INVENTION

The present invention relates to a privacy stamp and, in particular, a privacy stamp for a mobile telephone.

BACKGROUND OF THE INVENTION

A well-known feature of mobile telephones is so called caller-identification, or caller-ID, whereby the caller's telephone number is displayed on the user interface (UI) of a telephone receiving a call. In order to do this, the receiving telephone decodes a signal, which is associated with the call, containing the caller's number. If the caller's details are stored in the memory of the receiving phone, the UI may also display the caller's name. Caller-ID enables the user of a telephone receiving a call to check as to who is calling them, before they decide to answer.

The UI of a mobile telephone also commonly displays prompts to events stored in the telephone's memory, such as events entered in the telephone's calendar.

The disadvantage of a telephone's UI displaying such information is that the information can be read, not only by the telephone's owner, but also by any other person in the telephone's near vicinity. Hence the telephone's owner is not provided with the privacy he or she may desire. In attempting to protect their privacy, the owner may be constrained into not using some of the features offered by their telephone, such as alerts to private events recorded in the calendar. Alternatively, the user may decide to leave the telephone hidden from view, thus potentially missing calls and other types of alert altogether.

SUMMARY OF THE INVENTION

According the present invention, there is provided mobile telecommunications apparatus comprising a user interface, a processor, a memory operable to store user defined data items, the processor being operable to feed the stored data items to the user interface automatically for display in response to a triggering event, user operable means to associate a privacy stamp selectively with the stored data items, and the processor being responsive to the privacy stamp to prevent data items associated with the privacy stamp from being displayed by the user interface.

The data items may comprise the identity of contacts in association with a caller ID, and the triggering event may comprise an incoming call with a call ID corresponding to a call ID stored in the memory, such that the identity of the contact for the incoming call is displayed automatically except when said privacy stamp is associated therewith.

The data items may alternatively comprise diary entries associated with particular times, and the triggering event may comprise a time corresponding to the time associated with a diary entry stored in the memory, such that the diary entry is displayed automatically except when said privacy stamp is associated therewith.

The user interface may be operable to provide an output signifying the occurrence of the triggering event, without displaying the associated data item, in the event that a privacy stamp is associated with the data item.

Further, according to the present invention, display of a data item associated with a privacy stamp may be selected by user operable means in response to the output signifying the occurrence of the triggering event.

The user interface may comprise first and second displays, wherein the first display is operable to display the data item selectively depending on whether a privacy stamp is associated therewith upon the occurrence of the triggering event, and the second display is operable to display the data item irrespective of whether a privacy stamp is associated therewith.

BRIEF DESCRIPTION OF THE DRAWINGS

Embodiments of the present invention will now be described, by way of example, with reference to the accompanying drawings, in which:

FIG. 1 is an illustration of a mobile flip-telephone, having a base and a lid connected together by a hinge joint, where the hinge joint is in a closed position.

FIG. 2 is an illustration of a mobile flip-telephone having a base and a lid connected together by a hinge joint, where the hinge joint is in an open position.

DETAILED DESCRIPTION OF THE PREFERRED EMBODIMENTS

Figure 3:
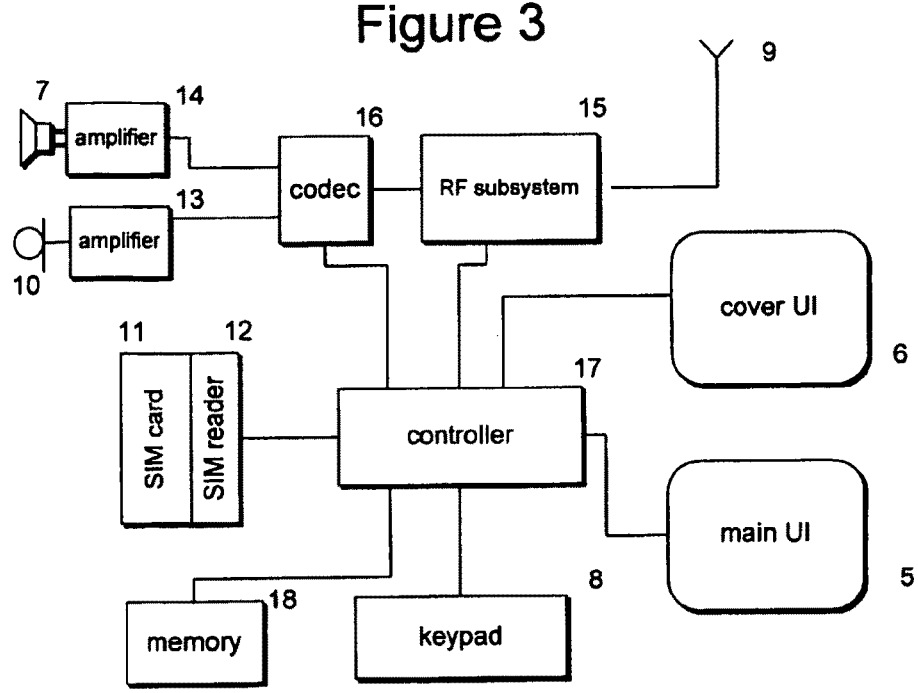
FIG. 3 is a block diagram of a mobile telephone including a main UI 5 and a cover UI 6.

Referring to FIG. 1, a mobile telecommunications apparatus, according to the present invention, comprises a mobile telephone handset 1. The handset 1 comprises first and second body parts, comprising a base 2 and a lid 3. The base 2 and the lid 3 are connected together and are movable from a first, closed position to a second, open position by means of a hinge joint 4. The base 2 and the lid 3 are approximately equal in size and are substantially flat, having a depth much less than their length and width. The hinge joint 4 is provided such that the base 2 and the lid 3 are able to hinge apart, approximately doubling the telephone's length. There is a stop provided such that the hinge is not able to open past a predetermined point (not shown).

When the telephone handset 1 is not in use, the hinge joint 4 is kept closed. In this position, the lid 3 lies on top of the base 2, substantially covering it. With the hinge joint 4 closed, the telephone handset 1 is more compact and is easier to carry in a pocket or bag.

The telephone handset 1 is configured to operate in a cellular radio network, such as a GSM network, although it could be configured for use with other networks such as a 3G network or I-mode.

The telephone handset 1, referring to FIGS. 1 and 2, is provided with two user interfaces (UIs), for example in the form of liquid crystal display (LCD) panels. The UIs comprise a main UI 5 and a cover UI 6. The two UIs are located on opposite surfaces of the lid 3 of the telephone handset 1, such that they lie back to back. The telephone handset 1 is additionally provided with a loudspeaker 7, which is located in the lid 3 and is on the same surface as the main UI 5. The base 2 of the telephone handset 1 houses the remainder of the telephone's principal components, including a keypad 8, an antenna 9 and a microphone 10.

The keypad 8 is located on the surface of the base 2 such that, when the hinge joint 4 is in the closed position, the keypad 8 directly faces the main UI 5. The microphone 10 is located on the same surface as the keypad 8. The antenna 9 is located inside the base 2 of the telephone handset 1 such that it does not form part of the handset's exterior.

Again referring to FIG. 1, when the hinge joint 4 of the telephone handset 1 is in the closed position, the main UI 5, located in the handset's lid 3, lies face down on the handset's base 2, such that it faces the keypad 8. Thus, the main UI 5 and keypad 8 are not visible to the user when the hinge 4 is closed. The cover UI 6 is located on the opposite side of the lid 3 to the main UI 5 and faces outwardly. It is fully visible in both the open and closed positions of the hinge 4.

The purpose of the cover UI 6 is to provide a supplementary UI which is visible to the user when the hinge joint 4 of the telephone handset 1 is closed. The cover UI 6 idly displays information such as the time, the date, the network signal strength and the battery level. Additionally, upon the telephone receiving a call, the cover UI 6 displays caller-ID.

Referring to FIG. 3, the mobile telephone handset 1 comprises the main user interface 5, the cover user interface 6, the loudspeaker 7, the keypad 8, the antenna 9, the microphone 10, a SIM card 11, a SIM card reader 12, amplifiers 13 and 14, an rf subsystem 15, a codec 16, a micro-controller 17 and a memory 18.

The rf subsystem 15 contains the circuits of the telephone's transmitter and receiver. The rf subsystem 15 is coupled to the antenna 9 for the reception and transmission of radio waves.

The antenna 9 is connected through the rf subsystem 15 to the codec 16, which is configured to process signals under the control of the micro-controller 17.

The micro-controller 17 operates according to a program stored in the memory 18 and controls the operation of the mobile telephone handset 1. It is coupled to the rf subsystem 15 for supplying tuning instructions to a frequency synthesizer.

The cover UI 6 and main UI 5 are connected to the micro-controller 17 for receiving control data and the keypad 8 is connected to the micro-controller 17 for supplying user input data. In FIG. 3, the memory 18 is shown separately from the micro-controller 17. However, the memory 18 and the controller 17 may also be included together in an integrated unit.

The amplifier 14 amplifies demodulated audio from the codec 16 and applies it to the loudspeaker 7. Acoustic signals, detected by the microphone 10, are pre-amplified by the amplifier 13 and sent to the codec 16 for coding.

Information concerning the identity of the user is held on the smart card 11 in the form of a GSM SIM card which contains the usual GSM international mobile subscriber identity (IMSI) and an encryption key $K_i$ that is used for encoding the radio transmission in a manner that is well known. The SIM card is removably received in the SIM card reader 12.

Figure 4:
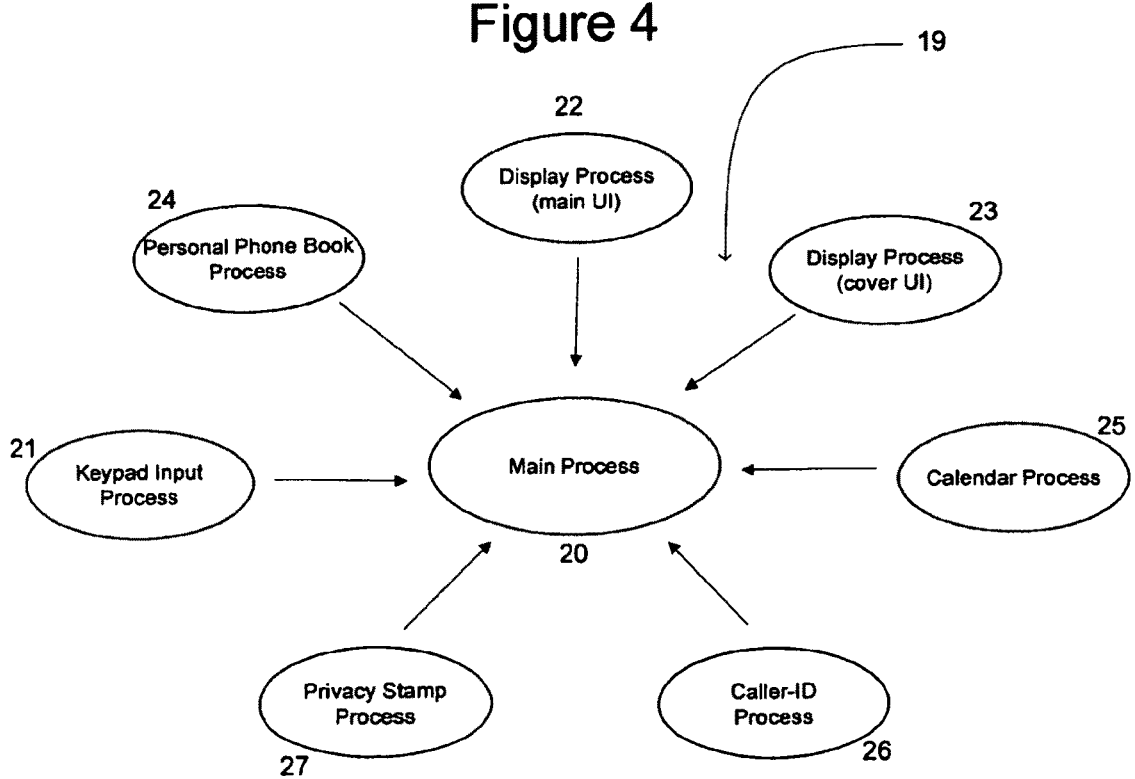
FIG. 4 is a diagram showing the structure of the mobile telephone's operating software 19.

Referring to FIG. 4, the memory 18 contains software 19, through which the user operates the telephone handset 1. The software 19 comprises a main process 20 and a plurality of auxiliary processes. The main process 20 controls all of the operations associated with the transmitting, receiving and processing of the rf communication through the network, and additionally acts as a hub for the auxiliary processes. The main process 20 also receives inputs from a keypad process 21, which is responsive to the actuation of the keypad 8, and instructs display processes 22 and 23.

The auxiliary processes provide additional features of the telephone handset 1, and include a personal phone book process 24, a calendar process 25, a caller-ID process 26 and a privacy stamp process 27.

A personal phone book 28, provided by auxiliary process 24, allows the user to define data items, relating to individual contacts, and store them in the telephone's memory 18. Each contact entry will commonly include information such as the contact's name, telephone numbers, fax number, postal address and email address.

A calendar 29, provided by auxiliary process 25, works in conjunction with the telephone's clock 30 and allows the user to define data items, such as diary events, and to record them in the telephone's memory 18. The calendar 25 is provided with an automatic reminder system, which prompts the user at a set time close to, or on the day of, the diary event.

The caller-ID process 26 decodes a signal, associated with an incoming call, which contains the caller's telephone number. The caller's telephone number can then be displayed on the cover UI 6.

The privacy stamp process 27 enables the user to mark certain memory content as "private" by attaching a privacy stamp 31. Memory content marked "private" is prevented from being displayed on the telephone's cover UI 6.

Figure 5:
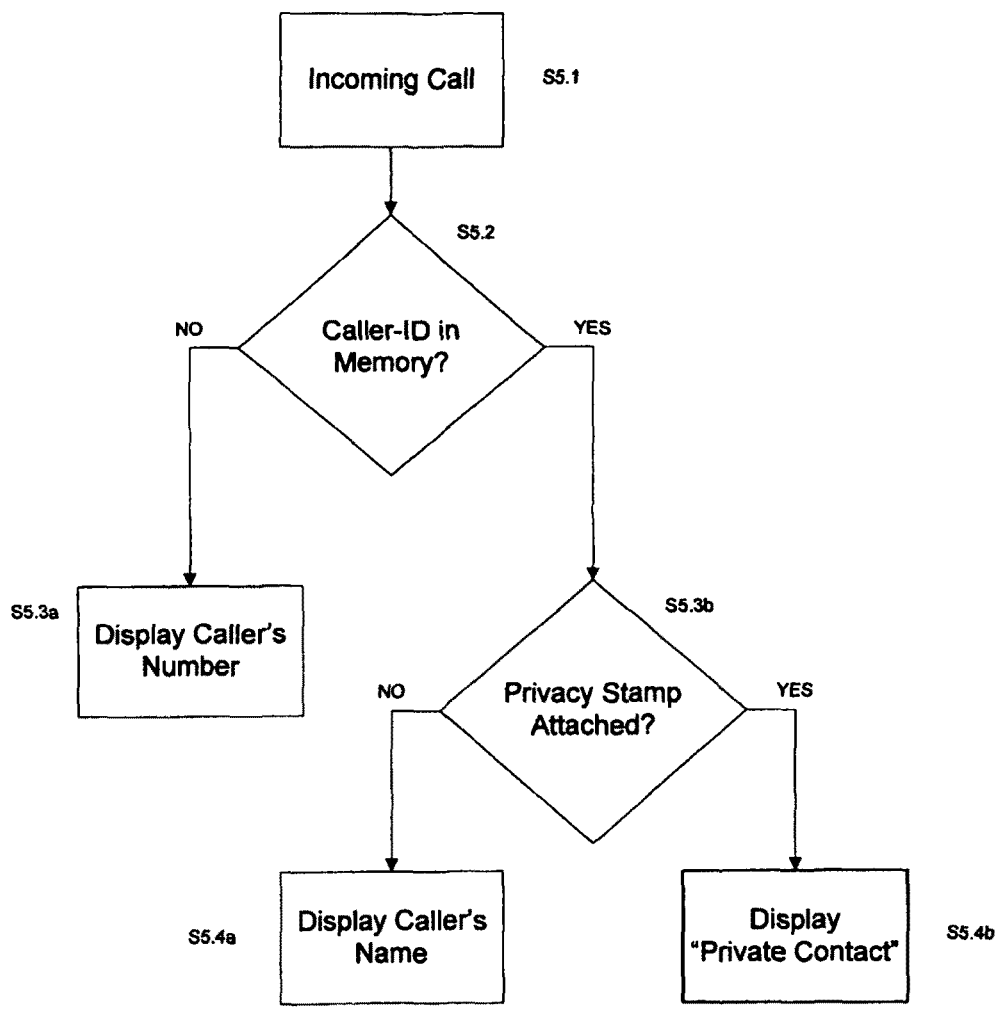
FIG. 5 is a flow diagram showing the steps associated with the operation of a privacy stamp in relation to an incoming telephone call.
Figure 6:
FIG. 6 is an illustration of a mobile telephone receiving a call and displaying the caller-ID on a cover UI.

Referring to FIG. 5, according to an embodiment of the present invention, the privacy stamp 31 is provided such that particular contacts in the telephone's personal phone book 28 can be marked "private". According to this embodiment, when a triggering event occurs, such as the mobile telephone handset 1 receiving a telephone call at step S5.1, the controller 17 decodes the caller-ID signal and communicates with the memory 18 to ascertain as to whether the caller's number is stored under a contact name in the personal phone book 28, as shown in step S5.2. Referring to step S5.3a, if the caller's number is not stored in the personal phone book 28, then the controller 17 instructs the cover UI 6 to display the caller-ID, as shown by FIG. 6.

If the caller's number is stored under a contact name in the personal phone book 28, the controller 17 further checks, in step S5.3b of FIG. 5, as to whether the contact in question is marked "private". Referring to step S5.4a, if the contact is not marked "private", then the controller 17 instructs the cover UI 6 to display the contact's name. The display will thus be as shown in FIG. 6, but with the addition of the contact's name being displayed, the name having been retrieved from the contact information stored in the personal phone book 28 of the memory 18.

Figure 7:
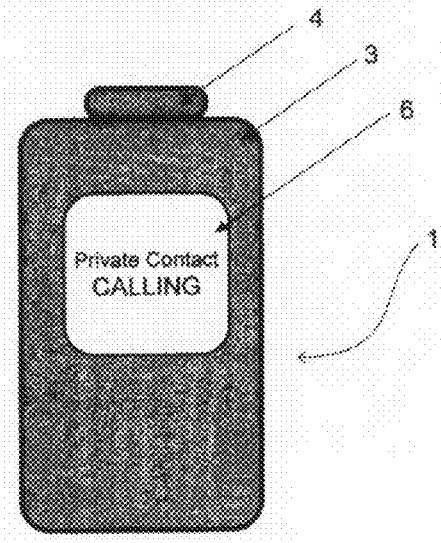
FIG. 7 is an illustration of a mobile telephone receiving a call from a private contact, whereby caller-ID is prevented from being displayed.

Referring to step S5.4b of FIG. 5, if the contact is marked "private", then the controller 17 instructs the cover UI 6 to display an alert to the user that the incoming call is "private", as shown by FIG. 7. In order to view the caller-ID, the telephone's user opens the hinge joint 4 of the telephone 1 and views the main UI 5, where the caller-ID is always displayed. In doing this, the user can be sure that it is only they who see the caller's details. The user is then able to answer the call by pressing a key on the telephone's keypad 8.

If the caller's number does not correspond to a contact marked "private", the call is automatically answered upon the user opening the hinge joint 4 of the telephone handset 1.

Figure 8:
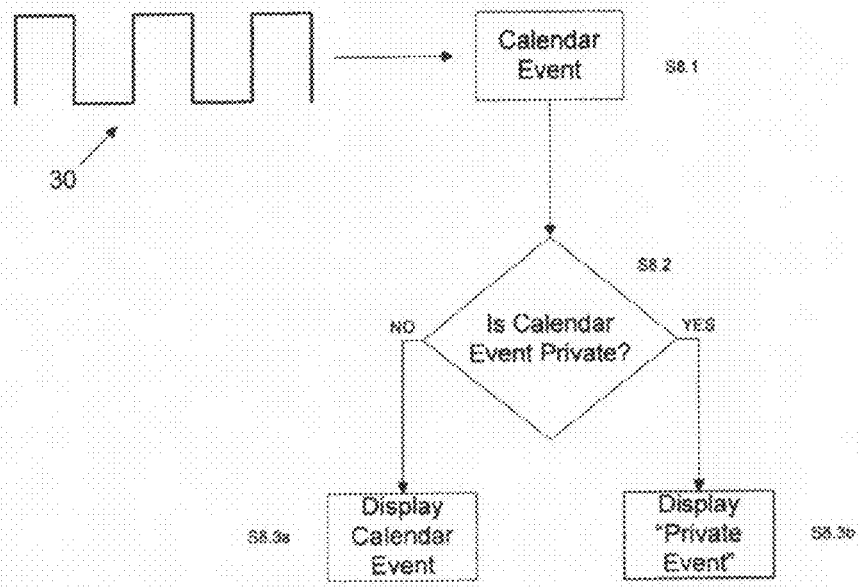
FIG. 8 is a flow diagram showing the steps associated with the operation of a privacy stamp in relation to the activation of a diary entry in the telephone's calendar.

In addition, the privacy stamp 31 can be provided such that events stored in the telephone's calendar 29 can be marked "private". Referring to FIG. 8, in steps S8.1 and S8.2, when a triggering event occurs, such as a reminder alarm set for a particular calendar event being activated, the controller 17 communicates with the memory 18 to ascertain as to whether the calendar event is marked "private".

If the event is marked "private", the controller 17 instructs the cover UI 6 to display an alert to the user indicating a "private calendar event", as shown in step S8.3b. In order to view the calendar event, the telephone's user opens the hinge joint 4 of the telephone handset 1 and views the main UI 5, where the calendar event is displayed.

If the calendar event is not marked private, the controller 17 instructs the cover UI 6 to display the calendar event, as shown in step S8.3a.

Privacy stamps 31, according to the present invention, are set via the operating software 19 contained within the memory 18 of the mobile telephone 1. The software 19 takes the form of user menus, operated via the telephone's keypad 8, which are displayed by the main UI 5 of the mobile telephone 1.

Figure 9:
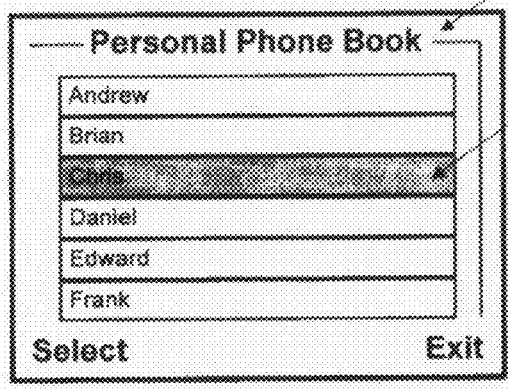
FIG. 9 is an illustration of a main UI displaying a personal phone book.

Referring to FIG. 9, the personal phone book 28 is accessed via the user menus of the software 19. The personal phone book 28 takes the form of a list of contact names. The personal details of each contact can be edited via a personal option menu 32, which is accessed by moving a cursor 33 to select the desired contact.

Figure 10:
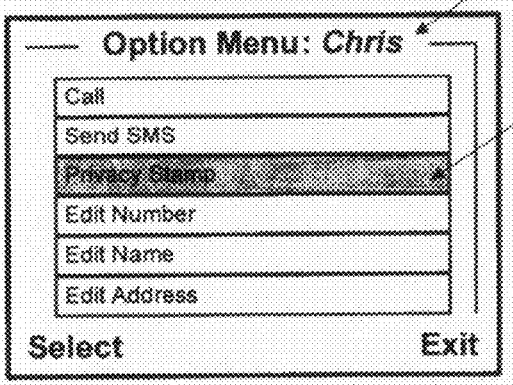
FIG. 10 is an illustration of a main UI displaying a personal option menu within a personal phone book.

Referring to FIG. 10, the personal option menu 32 provides an option to set a privacy stamp 31. The privacy stamp 31 is set by moving the cursor 33 to select "privacy stamp".

Figure 11:
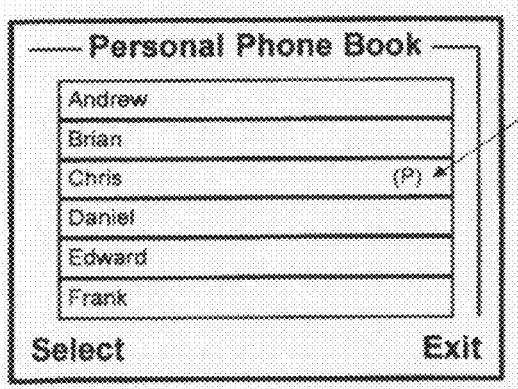
FIG. 11 is an illustration of a main UI displaying a personal phone book, in which one contact is marked with a privacy stamp P.

Referring to FIG. 11, a privacy stamp 31 is then attached to the specified contact name and is stored in the mobile telephone's personal phone book 28. Privacy stamps 31 can also be attached to diary events stored in the mobile telephone's calendar 29 by a similar method.

Figure 12:
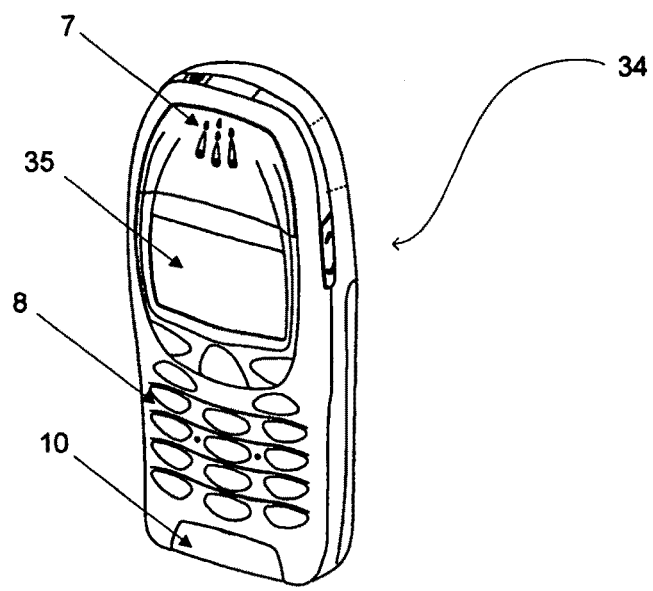
FIG. 12 is an illustration of a monoblock mobile telephone.

Referring to FIG. 12, in an alternative embodiment of the invention, the mobile telecommunications apparatus comprises a monoblock mobile telephone 34 having a single user interface 35. As with the previously described handset 1, the monoblock handset 34 is additionally provided with a loudspeaker 7, a keypad 8, an antenna 9, a microphone 10, a SIM card 11, a SIM card reader 12, amplifiers 13,14, an rf subsystem 15, a codec 16, a micro-controller 17 and a memory 18.

It will be appreciated that the scope of the invention is not restricted to mobile telephones, but is also applicable to other types of telecommunications apparatus such as personal digital assistants (PDAs) and personal computers operating peer-to-peer internet applications such as Skype. Furthermore, the filtering action of the privacy stamp is applicable to all types of receiving station having user interfaces.

The invention claimed is:

1. An apparatus comprising:
a user interface comprising at least a first display device and a second display device;
a processor;
a memory configured to store user defined data items;
wherein the processor is configured to associate a privacy stamp selectively with the stored data items in response to one or more user selections;
wherein the processor is configured to feed the stored data items to the user interface in response to a triggering event;
wherein the processor is further configured, upon detection of a triggering event, to examine the stored data items associated with the triggering event to determine if they are associated with a privacy stamp;
wherein the processor is further configured, if the stored data items are associated with a privacy stamp, to cause at least one display device to present a notification of the triggering event and to cause at least one display device to prevent automatic display of at least some of the stored data items in response to a triggering event and, upon an explicit user selection made after the notification of the triggering event, to cause display of at least some of the data items whose display was so prevented; and
wherein the processor is further configured to, if the triggering event is an incoming call, cause the apparatus to answer the incoming call only in response to an explicit user selection indicating a choice to answer the incoming call if the data items associated with the incoming call are associated with a privacy stamp.

2. The apparatus according to claim 1, wherein the data items comprise the identity of contacts associated with a caller ID, and the triggering event comprises an incoming call with a caller ID corresponding to a caller ID stored in the memory, such that the identity of the contact for the incoming call is displayed automatically on both the first and the second display devices except when said privacy stamp is associated therewith.

3. The apparatus according to claim 2 wherein the processor is configured to:
compare the caller ID of an incoming call with the caller IDs of contacts stored in the memory to determine if the incoming call is from a contact stored in the memory;
determine if a privacy stamp is recorded for the contact if the caller ID is located in the memory; and
cause the second display device to display data corresponding to the identity of the contact for the located caller ID only if no privacy stamp is located.

4. The apparatus according to claim 1 wherein the data items comprise diary entries associated with particular times, and the triggering event comprises a time corresponding to the time associated with a diary entry stored in the memory.

5. The apparatus according to claim 4 including a system clock and wherein the processor is configured to:
compare the time from the system clock with the times associated with diary entries stored in the memory to identify diary entries to be displayed by the user interface;
to determine if a privacy stamp is recorded for a diary entry identified for display; and
to cause the user interface to display data corresponding to the diary entry only if no privacy stamp is located.

6. The apparatus according to claim 1 wherein the user interface is configured to provide an output signifying the occurrence of the triggering event, without displaying the associated data item, in the event that a privacy stamp is associated with the data item.

7. The apparatus according to claim 1 comprising a body including first and second parts, with said first and second display devices mounted on said first and second body parts respectively, said body parts being movable from a first position in which the first body part covers the second display device, to a second position in which the second display device can be viewed by the user.

8. The apparatus according to claim 1, comprising a mobile telephone handset.

9. The apparatus according to claim 1 comprising a monoblock mobile telephone handset wherein the monoblock mobile telephone handset comprises a user interface.

10. The apparatus according to claim 1 wherein the user interface further comprises a keypad and wherein the processor is operable to provide a display of user selectable options on the user interface for selection by operation of the keypad, one of said options being configured to apply the privacy stamp to a selected one of the stored data items.

11. A method comprising:
- selectively associating a privacy stamp with one or more of a plurality of user defined data items stored in a memory;
- in response to a triggering event, feeding at least one of the data items to a user interface for display using one of at least a first display device and a second display device and causing at least one display device to present a notification of the triggering event and;
- controlling the user interface so as to prevent display of at least one of the data items on at least one of the displays, if the at least one of the data items is associated with a privacy stamp, except upon an explicit user selection by user operable means in order to allow display of the at least one of the data items, wherein the explicit user selection is received after presentation of the notification of the triggering event; and
- if the triggering event is an incoming call, answering the incoming call only in response to an explicit user selection indicating a choice to answer the incoming call if the data items associated with the incoming call are associated with a privacy stamp.

12. A computer readable memory storing a program of instructions execution of which by a processor causes an apparatus to perform the actions of:
- selectively associating a privacy stamp with at least one of a plurality of user defined data items stored in a memory;
- in response to a triggering event, feeding at least one of the data items to a user interface for display, wherein the user interface comprises at least a first display device and a second display device and causing at least one display device to present a notification of the triggering event and;
- controlling the user interface so as to the user interface to prevent display of the data item associated with the triggering event by at least one of the first display device and the second display device except upon an explicit selection by a user, wherein the explicit selection is received after presentation of the notification of the triggering event if the data item is associated with a privacy stamp; and
- if the triggering event is an incoming call, answering the incoming call only in response to an explicit user selection indicating a choice to answer the incoming call if the data items associated with the incoming call are associated with a privacy stamp.

* * * * *